United States Patent [19]

Blum et al.

[11] Patent Number: 4,769,410

[45] Date of Patent: Sep. 6, 1988

[54] CROSSLINKABLE COMPOSITIONS DISSOLVED OR DISPERSED IN AN ORGANIC SOLVENT AND HAVING A LONG SHELF LIFE, THEIR PREPARATION AND THEIR USE

[75] Inventors: Rainer Blum, Ludwigshafen; Gerd Rehmer, Bobenheim-Roxheim; Rolf Osterloh, Gruenstadt; Wolfgang Druschke, Dirmstein; Hans Sander, Ludwigshafen, all of Fed. Rep. of Germany

[73] Assignee: BASF Aktiengesellschaft, Ludwigshafen, Fed. Rep. of Germany

[21] Appl. No.: 917,608

[22] Filed: Oct. 10, 1986

[30] Foreign Application Priority Data

Oct. 11, 1985 [DE] Fed. Rep. of Germany ....... 3536262

[51] Int. Cl.$^4$ ............................ C08K 5/22; C08K 5/24; C08C 19/22
[52] U.S. Cl. ................................ 524/189; 524/191; 524/192; 525/376; 525/383
[58] Field of Search .................. 525/376, 383; 524/556

[56] References Cited

U.S. PATENT DOCUMENTS

| | | | |
|---|---|---|---|
| 3,025,265 | 3/1962 | Molda | 525/376 |
| 3,718,716 | 2/1973 | Joh et al. | 260/898 |
| 3,794,494 | 2/1974 | Kai et al. | 96/35.1 |
| 3,858,510 | 1/1975 | Kai et al. | 101/395 |
| 4,171,413 | 10/1979 | Hartman et al. | 525/329 |
| 4,191,838 | 3/1980 | Merger et al. | 560/205 |
| 4,250,070 | 2/1981 | Ley et al. | 260/29.6 |
| 4,266,007 | 10/1981 | Hughes et al. | 430/306 |
| 4,591,620 | 5/1986 | Zogg et al. | 525/376 |

FOREIGN PATENT DOCUMENTS

| | | |
|---|---|---|
| 0003516 | 8/1979 | European Pat. Off. |
| 2061213 | 1/1971 | Fed. Rep. of Germany |
| 2207209 | 1/1972 | Fed. Rep. of Germany |
| 2722097 | 10/1980 | Fed. Rep. of Germany |

*Primary Examiner*—Joseph L. Schofer
*Assistant Examiner*—Peter F. Kulkosky
*Attorney, Agent, or Firm*—Keil & Weinkauf

[57] ABSTRACT

Crosslinkable polymeric compositions which are dissolved or dispersed in an organic solvent, a process for their preparation and their use.

These polymeric compositions which undergo crosslinking at room temperature or elevated temperatures after drying are obtained by reacting polymeric organic compounds containing carbonyl groups with polyhydrazides in the presence of monoketones or monoaldehydes.

They are useful as crosslinking agents for polyepoxide compounds.

2 Claims, No Drawings

CROSSLINKABLE COMPOSITIONS DISSOLVED OR DISPERSED IN AN ORGANIC SOLVENT AND HAVING A LONG SHELF LIFE, THEIR PREPARATION AND THEIR USE

The present invention relates to polymeric compositions which are dissolved or dispersed in an organic solvent, have a long shelf life and undergo crosslinking at room temperature or on heating after the solvent has been released, a process for their preparation and their use.

The desire to take advantage of the wide range of possible reactions of hydrazides and polyhydrazides and other polymeric hydrazine derivatives and to use them industrially, for example for adhesives and sealants or decorative and protective coatings, etc., is apparent from a number of patent applications and publications which describe the preparation and use of polymeric hydrazides.

U.S. Pat. No. 4,171,413 describes the preparation of polyacrylohydrazides and points out the difficulty of obtaining hydrazine-free polyacrylohydrazides by reacting polyacrylates with hydrazine, because, at elevated temperatures, which are necessary for as complete conversion as possible, the products gel prematurely.

European Patent 0,003,516 describes aqueous polyacrylate dispersions which contain water-soluble hydrazides in the aqueous phase as well as added heavy metal ions. The addition of heavy metal ions prevents the formation of free hydrazine from the hydrazides. The hydrazides employed must be hydrazine-free. Methods of obtaining hydrazine-free hydrazides or hydrazine-free hydrazide solutions are not given.

U.S. Pat. No. 4,171,413 proposes a distillative method which is intended to give a residual hydrazine content of less than 1% in hydrazinolysis products of polyacrylates.

Despite the advantages, mentioned in these publications, of using hydrazides and polyhydrazides or polymeric hydrazide derivatives, such products are not used to a great extent industrially.

The main obstacle is that hydrazine is very toxic and carcinogenic, i.e. such products must not contain any free hydrazine if they are to be used industrially, and extreme and expensive safety precautions have to be taken.

Where the problem of free hydrazine in preparations for the area of coating materials, adhesives and sealants is mentioned at all in the literature, it is merely pointed out that hydrazine is toxic and the content of free hydrazine should be kept low.

Another obstacle to the use of polymeric polyhydrazides and monomeric polyhydrazides from solutions, particularly in the area of coating materials, adhesives and sealants, is the tendency of such solutions to gel as a result of hydrogen bridge bonds and other self-crosslinking reactions, or, when stored, to increase in viscosity to an extent which is unacceptable for use in practice.

It is an object of the present invention to provide a novel possible method of obtaining virtually hydrazine-free systems which have a long shelf life in the form of solutions or dispersions but nevertheless have the crosslinking functions stated in the cited literature and others which are typical for polyhydrazides and familiar to the skilled worker, in particular for applications in the area of coating materials, adhesives and sealants.

Because of the probable potential carcinogenicity of hydrazine, a residual hydrazine content is absolutely unacceptable for many fields of use.

It is in this respect that the present invention has a particular advantage since, in order to introduce the hydrazide structure into the polymers (A), it starts not from hydrazine but from hydrazides, which in the case of, for example, crystalline hydrazides, such as adipic acid dihydrazide, succinic acid dihydrazide or phthalic acid dihydrazide, are easy to purify by recrystallization.

The present invention relates to polymeric compositions which have a long shelf life when dissolved or dispersed in one or more organic solvents, undergo crosslinking at room temperature or on heating, e.g. up to 100° C., after the solvent has been released, and are obtained by reacting (A) polymeric organic compounds containing carbonyl groups in the presence of (B) monoketones and/or monoaldehydes with (C) polyhydrazides.

The resulting reaction products either undergo self-crosslinking after evaporation of the monoketones and/or monoaldehydes (B), i.e. when not all of the carbonyl groups of the polymeric organic compound (A) have been reacted with polyhydrazides (C), or can be used as crosslinking agents.

The novel polymeric compositions can be used as reactants for further carbonyl-containing polymers, which may have the same composition as component (A) or a different composition.

The polymeric compositions according to the invention may also be used as crosslinking agents for polyepoxide compounds. The polyepoxides can be fairly high molecular weight resin-like solid and/or liquid substances, or low molecular weight substances which may be regarded as crosslinking agents for the novel polymeric compositions.

For example, a typical application of the solutions of the novel products, which have a long shelf life, is as a curing agent for epoxide coatings for coating industrial floors; the processor need not take any special protective measures over and above those usual for coatings. Solutions of crosslinking agents which still contain free hydrazine cannot be used for such purposes.

The novel polymeric compositions have a long shelf life in solutions or dispersions containing monoketones and/or monoaldehydes and undergo crosslinking spontaneously at room temperature or at slightly elevated temperatures when the solutions or dispersions are dried after evaporation of the monoketones and/or monoaldehydes. Their crosslinking principle is based on the reaction of hydrazide and/or hydrazone and/or hydrazinocarbinol groups with carbonyl groups, the hydrazide, hydrazone and/or hydrazinocarbinol groups being bonded to the polymers via hydrazone and/or hydrazinocarbinol groups.

The carbonyl groups may be present on the same polymer chains as the hydrazide and/or hydrazone and/or hydrazinocarbinol groups, or on other polymer chains.

Regarding the components of the novel compositions, the following may be stated specifically:

(A) Polymeric organic compounds containing carbonyl groups can be obtained by a conventional prior art method according to various principles. The said compounds (A) as such and their preparation do not form subjects of the present invention. Only examples of such substances are given below. This list is not complete and is intended to serve only as an illustration.

Examples of suitable polymers are those which contain carbonyl groups introduced by copolymerization.

These include copolymers of (a) carbonyl-free monomers or monomer mixtures of, for example, (meth)acrylates of alcohols of 1 to 20 carbon atoms, such as methyl, ethyl, propyl, n-, iso- and tert-butyl, cyclohexyl, 2-ethylhexyl, decyl, lauryl and stearyl acrylate or methacrylate, vinyl esters of carboxylic acids of 1 to 20 carbon atoms, such as vinyl formate, acetate, propionate, butyrate, laurate and stearate, vinyl ethers of up to 22 carbon atoms, such as methyl, ethyl, butyl, hexyl or octadecyl vinyl ether, vinylaromatics of 8 to 12 carbon atoms, such as styrene, methylstyrene, vinyltoluenes, tert-butylstyrene or halostyrenes, olefins of 2 to 20 carbon atoms, such as ethylene, propylene, n- and isobutylene, diisobutene, triisobutene or oligopropylenes, vinyl halides, such as vinyl chloride and bromide and vinylidene chloride, allyl ethers, allyl alcohols and/or allyl esters, with the concomitant use of (b) copolymerizable carbonyl compounds, for example $\alpha, \beta$-monoolefinically unsaturated aldehydes and/or ketones, such as acrolein, methacrolein, vinyl alkyl ketones, where alkyl is of 1 to 20 carbon atoms, formylstyrene, (meth)acryloxyalkanals and -alkanones, the preparation of which is described in, for example, German Laid-Open Application DOS No. 2,722,097, N-oxoalkyl(meth)acrylamides, as described in, inter alia, U.S. Pat. No. 4,266,007 and German Laid-Open Applications DOS No. 2,061,213 or DOS No. 2,207,209, e.g. N-3-oxobutylacrylamide and -methacrylamide, N-1,1-dimethyl3-oxobutyl(meth)acrylamide, diacetone(meth)acrylamide and N-3-oxo-1,1-dibutyl-2-propylhexylacrylamide, and furthermore acetonyl and diacetone (meth)acrylate, acrylamido pivalaldehyde or mixtures of these comonomers. 3-Oxoalkyl (meth)acrylates and N-3-oxoalkyl(meth)acrylamides and methyl vinyl ketone, methacrolein and acrolein are preferred.

The copolymers (A) may also be prepared with the concomitant use of other monomers containing functional groups, for example those containing hydroxyl groups, such as hydroxyalkyl (meth)acrylates, e.g. 2-hydroxypropyl acrylate or methacrylate, 2-hydroxyethyl (meth)acrylate or 4-hydroxybutyl (meth)acrylate, and polymerizable carboxylic acids, e.g. acrylic acid, methacrylic acid and maleic acid.

Copolymers (A) of this type generally have K values of from 10 to 200, preferably from 12 to 30, determined according to DIN 53,726.

The content of carbonyl oxygen in component (A) is, in particular, from 0.001 to 12, preferably from 0.1 to 4, % by weight.

(B) Component (B) consists of one or more monofunctional monoketones and/or monoaldehydes, preferably those having boiling points of from 30° to 200° C., for example aliphatic, cycloaliphatic, aromatic and/or araliphatic ketones and aldehydes, examples of aldehydes being acetaldehyde, propionaldehyde, butyraldehyde, benzaldehyde, phenylacetaldehyde and terpene aldehydes, and examples of ketones being dialkyl ketones, such as acetone, methyl ethyl ketone, diethyl ketone, isopropyl methyl ketone, n-propyl methyl ketone, di-isopropyl ketone, di-n-propyl ketone, tert-butyl methyl ketone, isobutyl methyl ketone, sec-butyl methyl ketone and diisobutyl ketone, cycloaliphatic ketones, such as cyclohexanone, and araliphatic ketones, such as acetophenone. Dialkyl ketones having a boiling point of from 50° to 150° C. are preferably used.

(C) Examples of suitable polyhydrazides (C) are dihydrazides of organic di- and oligocarboxylic acids, e.g. malonic, succinic, glutaric, adipic, pimelic, suberic, azaleic, sebacic, undecanedioic, dodecanedioic, tridecanedioic, tetradecanedioic, pentadecanedioic, hexadecanedioic and 2-methyltetradecanedioic acid dihydrazide, methyl-, ethyl-, propyl-, butyl-, hexyl-, heptyl-, octyl-, 2-ethylhexyl-, nonyl-, decyl-, undecyl- and dodecylmalonic acid dihydrazide, methyl-, ethyl-, propyl-, butyl-, hexyl-, heptyl- and octylsuccinic acid dihydrazide, 2-ethyl-3-propylsuccinic and -glutaric acid dihydrazide, cyclohexanedicarboxylic acid dihydrazide, cyclohexylmethylmalonic acid dihydrazide, terephthalic, phenylsuccinic, cinnamylmalonic and benzylmalonic acid dihydrazide, pentane-1,3,5-tricarboxylic acid trihydrazide, hex-4-ene-1,2,6-tricarboxylic acid trihydrazide, 3-cyanopentane-1,3,5-tricarboxylic acid trihydrazide and dicyanofumaric acid dihydrazide, as well as the di- and oligohydrazides of dimeric and oligomeric unsaturated fatty acids.

Examples of suitable organic solvents are those conventionally used in the surface coatings industry, such as alcohols of 1 to 10 carbon atoms, glycol ethers, esters, aromatic, cycloaliphatic and aliphatic hydrocarbons and chlorohydrocarbons as well as the monoketones and/or aldehydes of component (B), where these possess suitable properties for surface coating applications, e.g. boiling point and dissolving power, and mixtures of these solvents.

Component (A) is combined with component (C) in general in amounts such that the ratio of the number of components of hydrazide groups of component (C) to the number of components of carbonyl groups of component (A) is from 0.1 to 2, preferably from 0.1 to 1.

The reaction of components (A), (B) and (C) is advantageously carried out at elevated temperatures of about 40°-120° C. in order to obtain a rapid reaction, which is desirable. It may also be advantageous to carry out the reaction in the presence of a catalytic amount of an acid, for example to use acidic copolymers (A) which contain carboxyl groups as copolymerized units. However, it is also possible to use other acids, e.g. p-toluenesulfonic acid, phthalic acid and phosphoric acid.

The reaction is advantageously effected in solution or dispersion, so that the substances, which are generally very viscous, are easier to handle. However, fairly high concentrations of, for example, more than 60% are preferred. Reactant (B), the number of equivalents of which may be substantially in excess of the number of equivalents of components (A) and (C), can simultaneously serve as the solvent or cosolvent.

The novel polymeric compositions which are dissolved or dispersed in organic solvents have a shelf life of more than one year. They crosslink at as low as room temperature after application to the substrate to be coated and release of the organic solvent. Increasing the temperature, for example up to 100° C., accelerates the crosslinking reaction.

The novel dissolved or dispersed polymeric compositions are useful as decorative and/or protective finishes and coatings on hard and soft substrates, as adhesives and sealants and as crosslinking agents for commercial epoxy resins. Compared with conventional polyamine crosslinking agents, they have the advantage of a substantially longer pot life.

EXAMPLE 1

100 g of methyl isoamyl ketone and 100 g of xylene were heated to 125° C. in a glass reaction vessel. A mixture of 490 g of ethylhexyl acrylate, 105 g of acrylic acid, 105 g of diacetoneacrylamide, 50 g of methyl isoamyl ketone, 50 g of xylene and 21 g of tert-butyl perbenzoate was added in the course of 2 hours, and the reaction mixture was then stirred for a further 3 hours at from 125° to 130° C. The resulting polymer solution contained 70% by weight of polymer (A), which had a K value of 15 according to DIN 53,726.

It was cooled to 70° C., 108 g of adipic acid dihydrazide and 110 g of cyclohexanone were added and stirring was continued at 70° C. After about 2 hours, a clear viscous solution resulted.

EXAMPLE 2

The procedure described in Example 1 was followed, except that 290 g of methyl methacrylate and 200 g of ethylhexyl acrylate were used instead of 490 g of ethylhexyl acrylate and, after the polymerization, 54 g, instead of 108 g, of adipic acid dihydrazide were used for the reaction. A crosslinkable polymeric system resulted. The polymer solution obtained was applied in a layer about 65 μm thick onto degreased steel sheet using a knife coater, and the layer was dried for 2 hours at 60° C. A hard coating having the following characteristics was obtained:
Pendulum hardness according to DIN 53,157: 183 s
Erichsen cupping according to DIN 53,156: 8.5"
Crosshatch test according to DIN 53,151:1

EXAMPLE 3

112 g of 2-ethylhexyl acrylate, 14 g of vinylpropionate, 6 g of monobutyl maleate, 5 g of acrylic acid and 1.4 g of diacetoneacrylamide were polymerized in 169 g of 65/95 gasoline at from 85° to 90° C. with the addition of 0.01 part of azoisobutyronitrile. A solution of a copolymer having a K value of 68 was obtained.

10 g of acetone and 4 g of the reaction product according to Example 1 were added, and a clear stable solution resulted. The solution was applied onto a polyethylene glycol terephthalate film in a layer about 25 μm thick, using a knife coater, and the layer was dried for 1 minute at 70° C. An adhesive film which adhered very well to smooth surfaces was obtained.

The adhesive properties of flat substrates which possess an adhesive coating can be determined by measuring the shear strength, as a measure of the cohesion, and the peel strength, as an overall measure of cohesion and surface tack. In the test, the dry, coated films were cut into 2 cm wide strips and these were applied to a chromium-plated brass sheet. The sheet with the strips was then stored for 24 hours at 23° C. and 65% relative humidity.

To measure the peel strength, the test strips were pulled off backward, parallel to the adhesive layer, at a rate of 300 mm/min. The force applied for this purpose was measured.

In the measurement of the shear strength, an area carrying an adhesive strip and measuring 20×45 mm was cut to size, the sheet was clamped vertically, and the overhanging part of the adhesive strip was loaded with a weight of 1 kg. The time taken to break the adhesive bond was determined, the measurement being carried out at 23° C. All measurements were carried out in triplicate.

The following adhesive properties were measured:
Cohesion >120 hours
Peel strength: 4.9 N/2 cm

EXAMPLE 4

18.5 g of an epoxy resin based on bisphenol A and having a mean molecular weight of 370 (for example the commercial product Epikote ® 828 from Shell) and 400 g of the reaction product according to Example 1 were mixed. The mixture had a pot life (storage time at room temperature until gelling begins) of more than 15 hours. When it was applied to degreased steel sheet, tough and resilient coatings exhibiting good adhesion were obtained after 48 hours.

We claim:

1. A polymeric compositin which has a long shelf life which composition consists essentially of
    (A) polymeric solution or dispersion organic compounds containing carbonyl groups
    (B) monoketones and/or monoaldehydes and
    (C) polyhydrazides, which undergo crosslinking at room temperature or on heating after the solvent and component (B) have been released, wherein the polyhydrazides (C) are present in an amount such that the ratio of the number of equivalents is from 0.1 to 2 based on the carbonyl group of component (A).

2. The composition of claim 1, wherein copolymers of (meth)acrylates with copolymerizable ketones, aldehydes or mixtures of such ketones and aldehydes are used as component (A).

* * * * *